United States Patent
Chatow et al.

(10) Patent No.: US 9,275,394 B2
(45) Date of Patent: Mar. 1, 2016

(54) IDENTIFYING USER-TARGET RELATION

(75) Inventors: Ehud Chatow, Palo Alto, CA (US); Andrew E Fitzhugh, Menlo Park, CA (US); Meghan J Kennedy, Palo Alto, CA (US); Alysha Naples, Oakland, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/126,711

(22) PCT Filed: Aug. 30, 2011

(86) PCT No.: PCT/US2011/049792
§ 371 (c)(1),
(2), (4) Date: Dec. 16, 2013

(87) PCT Pub. No.: WO2013/032451
PCT Pub. Date: Mar. 7, 2013

(65) Prior Publication Data
US 2014/0158756 A1 Jun. 12, 2014

(51) Int. Cl.
*G06F 17/00* (2006.01)
*G06Q 30/02* (2012.01)

(52) U.S. Cl.
CPC .................... *G06Q 30/0201* (2013.01)

(58) Field of Classification Search
USPC .......... 235/375, 462.01, 462.09, 383
See application file for complete search history.

(56) References Cited

U.S. PATENT DOCUMENTS

| 7,805,332 | B2 | 9/2010 | Wilson |
| 2008/0114639 | A1 | 5/2008 | Meek et al. |
| 2008/0270233 | A1 | 10/2008 | Yip et al. |
| 2011/0106610 | A1 | 5/2011 | Landis et al. |
| 2011/0137706 | A1 | 6/2011 | Howard et al. |
| 2011/0153398 | A1 | 6/2011 | Tjhai et al. |
| 2012/0168493 | A1* | 7/2012 | Worms .......................... 235/375 |
| 2013/0311329 | A1* | 11/2013 | Knudson et al. ............. 705/26.9 |
| 2014/0158760 | A1* | 6/2014 | Seker ............................ 235/380 |

FOREIGN PATENT DOCUMENTS

KR  10-1049090  7/2011

OTHER PUBLICATIONS

"How to Use Social QR Code with your Facebook Fan Page" Social QR Code, http://socialqrcode.com/blogdetail.php?Blog=MTA , posted by "Admin" on Jan. 7, 2011.
"Webtrends Marketing Warehouse", matraXis, http://www.matraxis.co.uk/webtrends/webtrends-marketing-warehouse.htm, printed Aug. 30, 2011.
Anonymous: "QR code—Wikipedia, the free encyclopedia", Aug. 29, 2011, XP055171417.

* cited by examiner

*Primary Examiner* — Ahshik Kim
(74) *Attorney, Agent, or Firm* — HP Inc. Patent Department

(57) ABSTRACT

A marked target representation (100; 200) includes a human-cognizable relation mark (104; 206). The marked target representation represents a target. An image capture device (130; 302) is used to capture (114; 413) an image (112; 304) of the target representation. A data structure (120; 332) indicating a relation between a user (125; 326) of the image capture device and the target is generated (116; 415) using the image.

12 Claims, 4 Drawing Sheets

IDENTIFYING USER-TARGET RELATION

BACKGROUND

Manufacturers, publishers, and retailers can benefit from detailed information regarding who is purchasing or who might want to purchase their products. Similarly, advertisers and their customers can benefit from detailed information regarding the effectiveness of their advertisements. However, surveys designed to gather such information tend to be intrusive and rarely capture a consumer's attitude.

BRIEF DESCRIPTION OF THE DRAWINGS

The following figures represent examples and not the invention itself.

DETAILED DESCRIPTION

Figure 1:
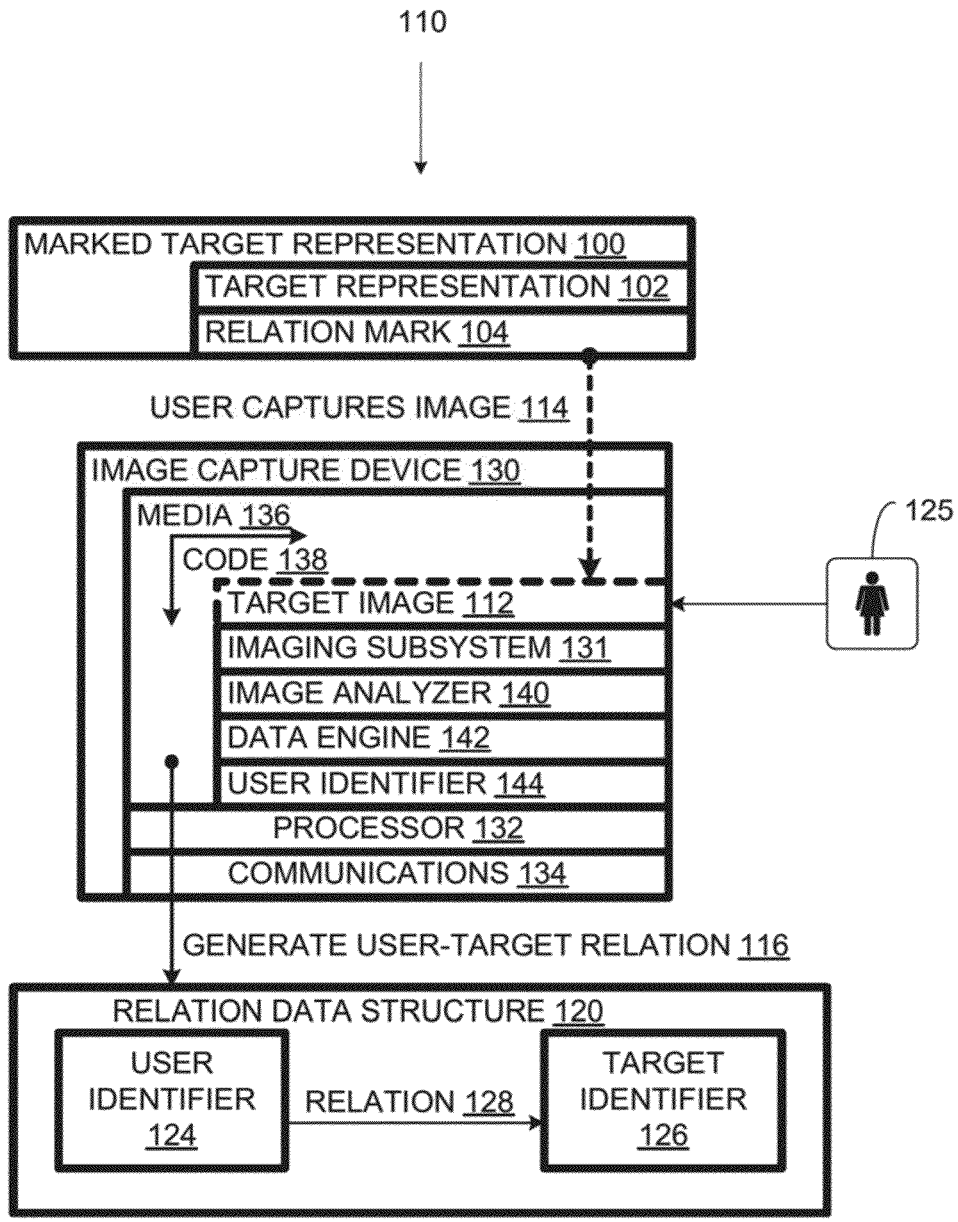
FIG. 1 is a schematic diagram of a system involving image capture of a marked target representation in accordance with an example.

A marked target representation 100 includes a target representation 102 of a target and a relation mark 104, as shown in FIG. 1. A process 110, involves capturing a target image 112 of marked target representation 100 at 114 and, at 116, using target image 112 to generate a data structure 120 indicating a relation 128 between a user identifier 124 of a user 125 and the target identifier 126 of a target. Process 110 thus allows a convenient way for a user to express a relation to a target; the relation data structure can then be used for real-time sharing among, e.g., among friends, and used by various entities, e.g., subscribers, for marketing or other purposes.

At 114, user 125 can capture target image 112 using an image-capture device 130. Image-capture device 130 includes an imaging subsystem 131, processor 132, communications devices 134, and storage media 136. Storage media 136 is encoded with code 138 defining an image analyzer 140, a data engine 142, user identifier 144, and, once it is captured, target image 112. Image analyzer 140 analyzes target image 112 so as to determine target identifier 126. Data engine 142 then generates data structure 120.

Figure 2:
FIG. 2 is a schematic diagram showing a marked target representation.

In the example of FIG. 2, a QR ("Quick Response") code 200 can represent a beverage product an instance of which is shown as bottle 202. QR code 200 differs from a standard QR code in that, in addition, to the two-dimensional optical data pattern 204 that identifies the target, QR code 200 includes a mark 206, which many humans would recognize as representing a "like" relation. Although like mark 206 may occlude a portion of QR pattern 204, QR code 200 is still readable to identify the intended target due to redundancy built into the QR code standard. Like mark 206 is intended to indicate to a human viewer that capturing an image of the incorporating QR code 200 will provide a distributable indication that the user likes the target.

Anything that can be represented by a QR code can be a target. For example, a QR code on a magazine cover can represent a magazine issue; a QR code on an advertisement can represent the product or service that is the subject of the advertisement. For example, clicking on a marked QR code in a printed advertisement for an overseas vacation can indicate a like of the vacation opportunity. A marked QR code on the door to a coffee shop can be used to indicate a like of the coffee shop.

The QR code identifies the target. If each bottle has a different QR code, then the QR code can represent a single bottle. If each store uses a different QR code for the same bottle, then the like relation is for the bottle in the store in which the image was captured. Different QR codes can be used for various other purposes; for example, different QR codes can be used to differentiate advertisements for the same product but presented in different magazines.

Other interactive print designs can be used as well. In some examples, alternatives to QR code are used. For example, bottle 202 could have been marked with like mark 206 but without QR pattern 204; in that case, bottle 202 would be the marked representation for the product beverage line of which it is an instance. Different marks can be used to indicate "like", and different relations, e.g., "dislike" can be presented as well.

To indicate a "like" or other relation to a target, a user can capture an image of target representation. In some cases, the image will include an image of the mark; but in some examples the image does not include an image of the mark. For example, the mark may be separate from the target representation. For example, the relation mark may be a frame around a QR code and the frame may not be in the field-of-view of the camera when the image is captured.

Figure 3:
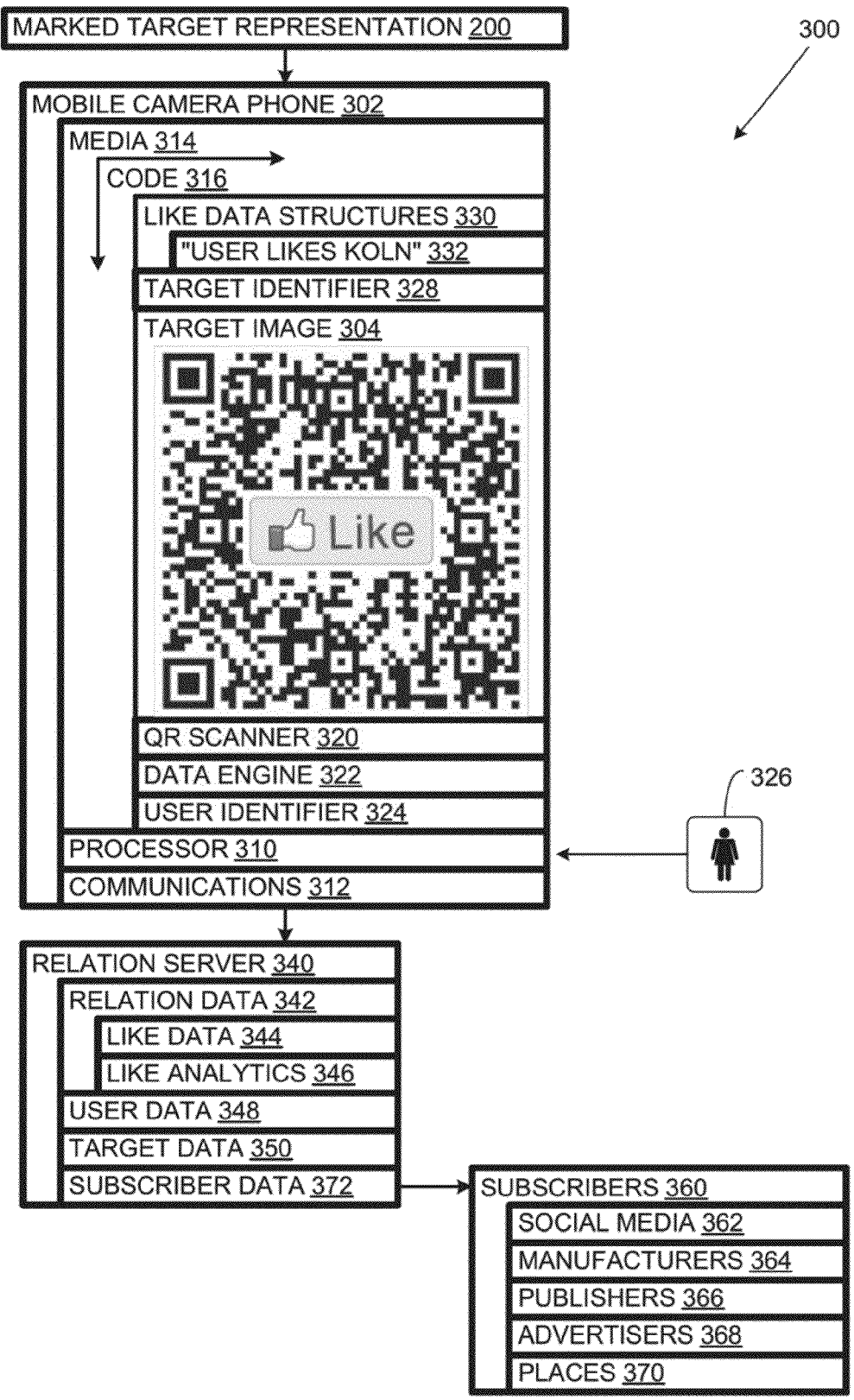
FIG. 3 is a schematic diagram of a system for capturing and using an image of the marked target representation of FIG. 2.

In system 300, shown in FIG. 3, a mobile camera phone 302 is used to capture a target image 304 of marked target representation 200. In other examples, cameras and scanners are used. Mobile camera phone 302 includes a processor 310, communications devices 312, and storage media 314. Media 314 is encoded with code 316 defining an image analyzer 320 and a data engine 322. In addition, code 316 defines a user identifier 324 identifying a user 326. When captured, target image 304 takes the form of some of code 316. When target image 304 is analyzed by image analyzer 320, code 316 represents the resulting target identifier 324. When data engine 322 relates the target identifier 328 and user identifier 324, some of code 316 represents the resulting "like" data structure 330, including data 332 indicating that user 326 likes the target.

Communications devices 312 can include cellular and Wi-Fi transceivers and antennas. Communications devices 312 are used to transmit like data 330 to a relation server 340. Relation server 340, which is a combination of hardware and software, stores relation data 342 from various users including like data 330 from user 326. In addition, relation server 340 aggregates relations for each user and across users and provides analytics 346, e.g., by deriving summary statistics from the relations and making inferences from the statistics. Relation server 340 stores user data 348 including permissions that specify what can and cannot be done with each user's data. In addition, relation server stores target data 350, specifying for each target, what is to be done with its data.

Typically, relation data 342 will be provided to subscribers 360. Subscribers 360 can include social media sites 362 that allow users to publicize their likes, manufacturers 364 of target products, publishers 366 of target publications and features, advertisers 368, and places 370, e.g., places of business. Relation server 340 includes subscriber data 372 which specifies what relation data 342 is provided to which subscribers.

Figure 4:
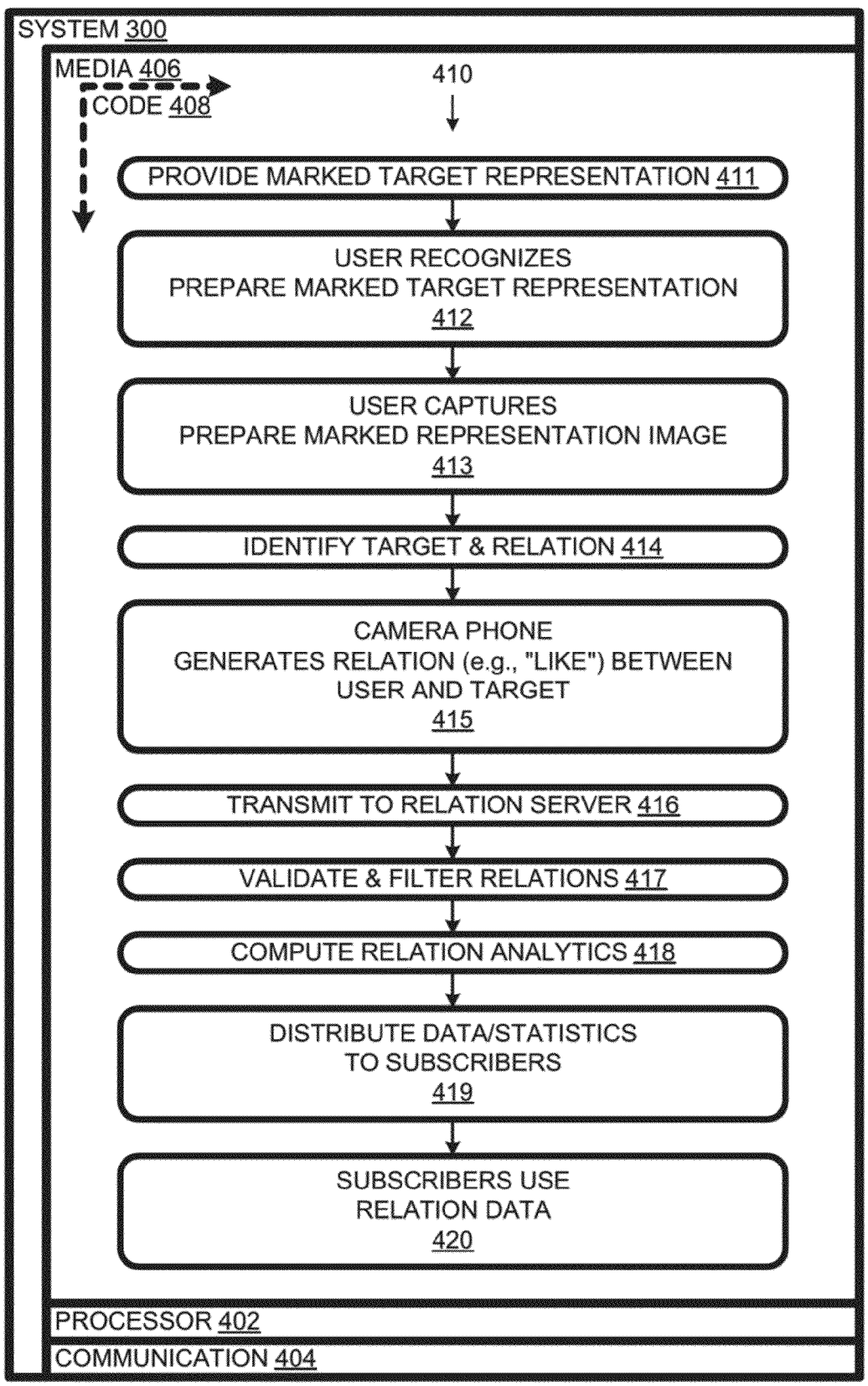
FIG. 4 is another view of the system of FIG. 3 including a flow chart of a process implemented by the system of FIG. 3.

System 300, as a whole, includes processors 402, communications devices 404, and storage media 406, as shown in FIG. 4. Storage media 406 is encoded with code 408 that, when executed by processors 402 provides for a process 410.

At 411, a marked target representation is provided. At 412, a user recognizes the marked target representation as a "relation-enabled" representation. In some case, there may be plural marked target representations for the same target but with different relations marked for each representation; in this case, a user can select a relation by selecting the target representation. At 413, in response to the recognition, a user captures a target image of the marked target representation so that it is stored on an image capture device. In some examples, a user may be given some choices at this point to select a relation type (e.g., like versus unlike) to be associated with the image or to select an action (save or discard, transmit or not) to be performed on the image.

At 414 a QR scanner or other image analyzer identifies a target from the target image. If more than one relation is provided for, the image analyzer can also identify the relation. Images that do not indicate a known target or relation are not processed further by process 410, although they can be retained as regular photographs. At 415, a data engine associates the target identifier and the relation with a user. In the case of mobile camera phones, the user can be automatically identified as the account holder or other user associated with the phone. Other types of image-capture devices may be programmed with a default user. In some examples, a default user can be overridden, e.g., by typing in an alternate user identifier.

At 416, the relation data is conveyed to a relation server. At 417, the relation data is subjected to a validation procedure including user authentication to filter out spam and other unwanted data. At 418, validated relation data is analyzed to provide analytics including statistics and inferences drawn from those statistics. At 419, relation data (raw and statistics) can be distributed to subscribers according to terms of subscriber agreements. At 420, subscribers use relation data, e.g., for user profiling, product development, marketing, etc.

Herein, a "system" is a set of interacting non-transitory tangible elements, wherein the elements can be, by way of example and not of limitation, mechanical components, electrical elements, atoms, physical encodings of instructions, and process segments. Herein, "process" refers to a sequence of actions resulting in or involving a physical transformation.

As used herein, "software" refers to machine-readable instructions and data. "Storage medium" and "storage media" refer to a systems including non-transitory tangible material in or on which information is or can be encoded so as to be readable by a computer. Media can be "computer-readable" for use by computers and "human cognizable" for use by humans.

Herein, a "server" is a real (hardware or combination of hardware and software) computer or set of computers that provides services to computers. Herein, unless otherwise apparent from context, a functionally defined component (image analyzer, scanner, data engine) of a computer is a combination of hardware and software executing on that hardware to provide the defined functionality.

In this specification, related art is discussed for expository purposes. Related art labeled "prior art", if any, is admitted prior art. Related art not labeled "prior art" is not admitted prior art. The illustrated and other described examples, as well as modifications thereto and variations thereupon are within the scope of the following claims.

What is claimed is:

1. A process comprising:
using an image capture device including hardware, capturing an image of a physical marked representation including a human-cognizable target representation of a target and a human-cognizable relation mark indicating a potential relation between a user of said device and a target represented by said marked target representation, wherein said target representation includes a QR code having a pattern and wherein said relation mark is an image within said pattern; and
generating, using said image, a data structure indicating a like relation between an identity of said user and said target.

2. A process as recited in claim 1 further comprising:
transmitting said data structure to a relation server;
distributing said data structure or data based in part on said data structure to a subscriber.

3. A process as recited in claim 1 wherein said potential relation is that said user potential likes said target.

4. A process as recited in claim 1 wherein said device is included in a camera phone.

5. A system comprising:
an imaging system for responding to a user action by capturing a target image of a marked target representation of a target;
an image analyzer for analyzing said image to determine a target identity of said target, wherein said image analyzer is to read a QR code having a pattern and to recognize a like mark within said pattern;
a data engine for generating a data structure identifying a like relation between said user and said target.

6. A system as recited in claim 5 further comprising a mobile camera phone including said image system, said image analyzer, and said data engine.

7. A system as recited in claim 6 wherein said mobile camera phone includes a wireless radio to transmit said data structure to a relation server.

8. A system as recited in claim 7 further comprising said relation server, said relation server being to transmit said data structure or analytics derived therefrom to subscribers to a relation service that uses said relations server.

9. A system comprising computer-readable storage media encoded with code to, when executed by a processor:
in response to a capture by an image capture device of an target image of a marked target representation of a target, analyze said target image to identify said target, wherein said marked target representation includes a QR code with a pattern and an image inside said pattern; and
generating a data structure defining a like relation between a user of said camera and said target, said relation being determined at least in part by a mark of said marked representation of said target.

10. A system as recited in claim 9 further comprising said processor.

11. A system as recited in claim 9 wherein said target image includes an image of said mark.

12. A system as recited in claim 9 wherein said relation is a "like" by said user of said target.

* * * * *